United States Patent [19]

Noyes

[11] Patent Number: 4,656,318

[45] Date of Patent: Apr. 7, 1987

[54] MODEM WITH POWER-OFF RING DETECTION

[75] Inventor: Harold B. Noyes, Corvallis, Oreg.

[73] Assignee: Hewlett-Packard Company, Palo Alto, Calif.

[21] Appl. No.: 732,525

[22] Filed: May 9, 1985

[51] Int. Cl.[4] ............................................. H04M 11/00
[52] U.S. Cl. ........................................ 379/93; 379/372
[58] Field of Search ................... 179/2 A, 2 C, 2 DP; 375/8; 364/200 MS File, 900 MS File

[56] References Cited

U.S. PATENT DOCUMENTS

| | | | |
|---|---|---|---|
| 3,956,740 | 5/1976 | Jones et al. | 364/900 |
| 4,051,326 | 9/1977 | Badagnani et al. | 179/2 DP |
| 4,121,052 | 10/1978 | Richard | 179/2 DP |
| 4,203,006 | 5/1980 | Mascia | 179/2 C |
| 4,365,290 | 12/1982 | Nelms et al. | 364/200 |
| 4,395,590 | 7/1983 | Pierce et al. | 179/2 DP |
| 4,591,662 | 5/1986 | Legros et al. | 179/2 DP |

OTHER PUBLICATIONS

MacBride et al, "Remote Computer Power-on Via Switched Telephone Network", *IBM Technical Disclosure Bulletin*, vol. 25, No. 6, Nov. 1982, p. 3064.

*Primary Examiner*—Keith E. George
*Attorney, Agent, or Firm*—James M. Williams

[57] ABSTRACT

A modem which can detect an incoming call and provide an indication of the incoming call to a host computer while the power to the modem is turned off, comprising a switchable power supply that can be turned on and off by a remote input from the host computer, a ring detector circuit that monitors for incoming calls and notifies the host computer through an open drain output without using power from the computer, and isolator circuits that provide isolation on all the input/output lines between the modem and the computer to prevent power leakage from the computer's power source when the switchable power supply is turned off.

4 Claims, 4 Drawing Figures

MODEM WITH POWER-OFF RING DETECTION

BACKGROUND OF THE INVENTION

For data transmission on a standard voice grade telephone line a modem is employed which is operative to modulate data in a form suitable for transmission along the telephone line, and to demodulate data received from the telephone line to reproduce the data transmitted from a remote site. The modem requires a power supply for energizing its electronic circuits, usually an AC power outlet or a battery source.

Providing the power for a modem is generally not a problem with computers which themselves operate from an AC power outlet. However, for battery operated portable computers, providing the power for a modem can be a significant drain on the limited power stored in the battery. This is particularly true if the modem is expected to monitor incoming calls over a long time period.

The ability to detect an incoming call and notify the host computer is a vital link to the useability of a particular modem/computer combination in providing electronic mail and remote database accessing functions. Any networking, database sharing or database updating system that relies on automatic dialing and answering between computers must have the ability to detect incoming calls, referred to as ring detection capability.

Modems in the past have had to have power on in order to detect and notify the host that an incoming call is being received. In a battery-powered computer, this is a critical waste of power which makes the system unacceptable. For example, if a computer consumed 1.3 mW in its "standby" mode while awaiting incoming data, but used a modem which required 225 mW of power to monitor and detect incoming calls, a battery which could provide one year "standby" power for the computer alone would provide only 40 hours of "standby" power for the computer and the modem together. Thus adding a high power consumption modem to a portable computer may negate the carefully designed power saving features incorporated in the computer.

There have been several alternative approaches proposed to provide ring detection and notification capability in the past, generally requiring that the modems be powered.

Modems commonly used with AC powered computers simply prohibit monitoring for incoming calls except at the times when full power is applied to the modem. An example of this approach is the Prentice Popcom X-100 modem. When power is disconnected, this type of modem cannot detect an incoming call or notify the host that such an event is occurring.

An alternative approach which provides ring detection with reduced power consumption is to allow parts of the modem's circuits to be powered off, keeping those circuits needed for ring detection running. An example of this approach is the Hewlett-Packard HP110 Portable Computer, which has a built in modem. It "shuts down" power to most of its modem circuitry to provide a lower-power ring detection capability, but still requires that some of its circuits have power on at all times.

Another proposed approach is to draw the operating power for the modem from the telephone lines rather than from the computer. Although this type of system does not deplete the computer's battery power, it suffers from other drawbacks. Federal regulations strictly limit the power that can be drawn from the telephone lines. This severely restricts the functions which a telephone line powered modem can perform. Typically, such modems are limited to low transmission rates in the range of 300 baud. Also, the power limitation prohibits implementation of the command set necessary to function as an "intelligent" modem.

SUMMARY OF THE INVENTION

The present invention provides a stand alone modem which can detect an incoming call and provide an indication of the incoming call to a host computer while the power to the modem is turned off. This power-off ring detection capability is provided by a modem which incorporates: a switchable power supply that can be turned on and off by a remote input (or inputs) from the host computer; a ring detection circuit that can monitor for incoming calls and notify the host computer through an "open drain" output without using power from the computer; and isolator circuits that provide isolation on all input/output lines between the host computer and the modem to ensure that when power for the modem is turned off, there is no power leakage from the host computer's battery to the modem and that the input/output lines are clamped to appropriate states to prevent damage to the components in the modem and in the computer.

The modem of the invention is particularly advantageous when used in combination with a host computer which can operate in a "sleep" mode while monitoring inputs from peripherals which are themselves shut down, and yet the computer can "wake up" automatically in response to a signal from a peripheral to power-up that peripheral and service its inputs, as needed.

The modem is normally in the power off state. However, the ring detection circuit remains capable of detecting an incoming call and notifying the host computer through the open drain output. The host computer can switch the modem on with the switchable power supply so that the modem can receive and demodulate the incoming data. The input/output isolation is important so that in the power-off state the modem cannot draw any power through these connections to the host computer, and to ensure that no electronic components are damaged by power surges when the modem is turned on or off. The modem/computer interface is defined such that all interfacing signals are clamped to an appropriate state, through the use of "open-drain" inputs, with the modem power turned off.

All of these elements have been combined in the system and modem illustrated in the preferred embodiment. This allows the host computer to monitor incoming calls while in a "sleep" mode using a minimal amount of current with the modem using zero current. Upon detecting an incoming call, the modem indicates to the computer that an incoming call is being received, whereupon the computer "wakes up" automatically and turns on the modem, so that the modem can answer the incoming call. The system can then transfer files, access a database, or perform other functions as programmed by the user. The key is that the entire system is using approximately one thousand times less power to monitor and service an incoming call than a typical CMOS computer would use to provide the same functionality without these innovations. This corresponds to approximately thirty thousand times less power than an NMOS computer. Thus, battery life for the computer system is maximized.

DETAILED DESCRIPTION OF THE INVENTION

Figure 1:
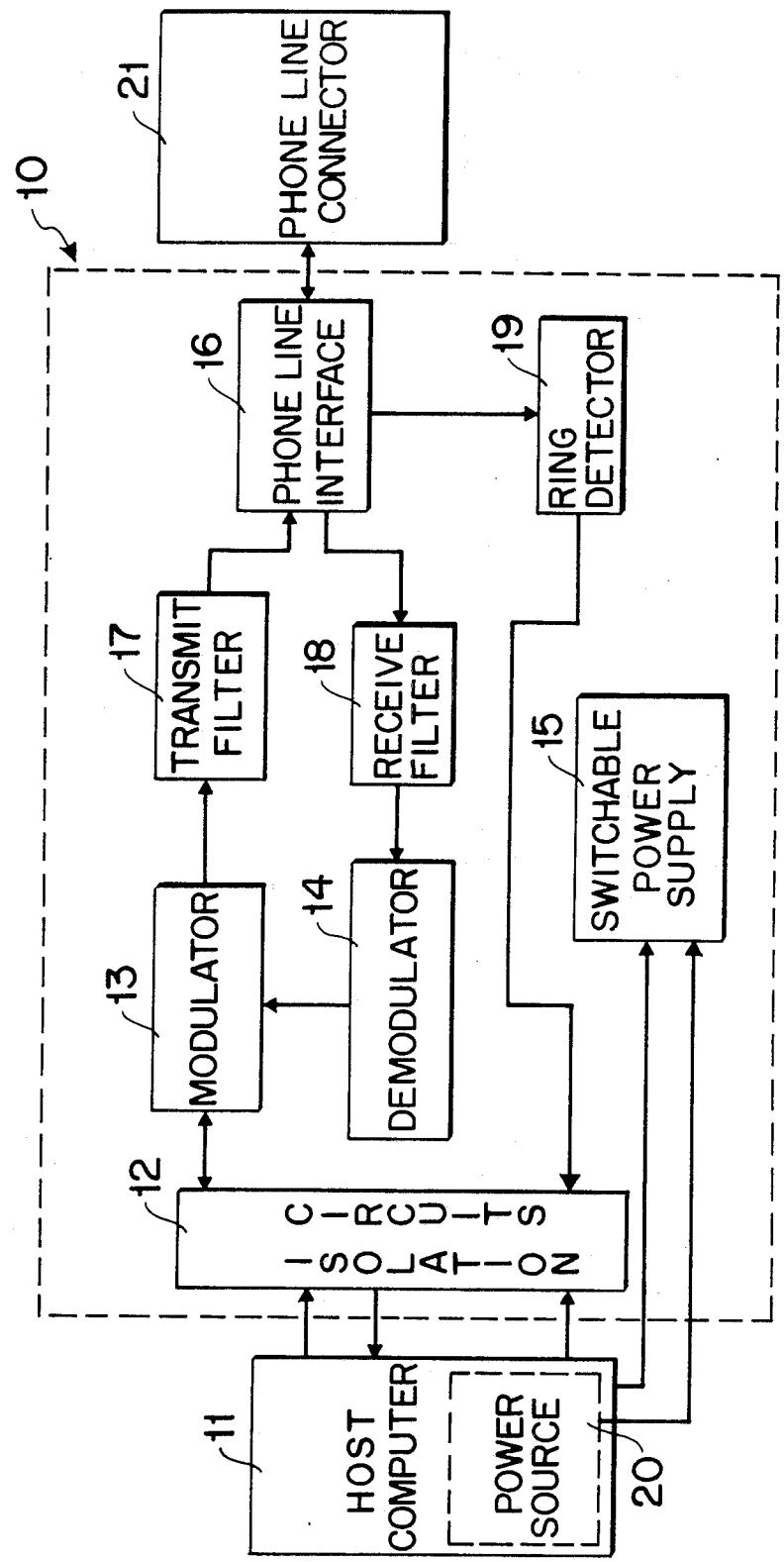
FIG. 1 is a schematic block diagram which illustrates a modem which embodies the invention, and its interconnections to a host computer and to the telephone lines.

A modem which embodies the invention is shown in FIG. 1. In the illustrated embodiment, the modem is a Bell 212A compatible intelligent modem with the ability to auto-answer and to auto-dial using either DTMF (touch-tone) or pulse dialing. It is capable of 1200 BPS Di-bit Phase Shift Keyed (DPSK) transmissions as well as Bell 103J (0 thru 300 BPS) Frequency Shift Keyed (FSK) transmissions. As an intelligent modem, commands to accomplish the most common modem functions, along with appropriate responses, are built in.

Referring to FIG. 1, a schematic diagram of the modem of the invention and its interconnections to a host computer and to the telephone lines is shown. Host computer 11 is connected to modem 10 through isolator circuit 12, as described in more detail below. Through this interface, host computer 11 transmits and receives digital data to modem modulator 13 and demodulator 14, and controls switchable power supply 15.

Modem 10 is connected to the telephone lines at connector 21 through phone line interface 16, which isolates the modem from the telephone circuits using optoisolators and a transformer as described below. Incoming data passes through interface 16 and through receive filter 18 to demodulator 14, where the analog incoming signal is transformed into a digital signal. The digital data signal then passes through modulator 13 and isolator circuit 12 to host computer 11. Digital data to be transmitted is sent by the host computer through isolator circuit 12 to modulator 13 where the digital signal is scrambled and encoded according to the Bell 212 specification. The data signal then passes through transmit filter 17 which transforms the signal into analog format suitable for telephone transmission and through phone line interface 16 to the telephone lines at connector 21.

Ring detector 19, which is also connected to phone line interface 16, monitors and detects incoming calls and transmits a signal to indicate the occurrence of an incoming call.

The modem also includes a microprocessor controller, not shown in FIG. 1, which can control certain aspects of the modem's operation. Host computer 11 communicates with the microprocessor through isolator circuit 12, so there is isolation at this interface also. Through the microprocessor, the host computer can alter certain aspects of the operation of modulator 13, demodulator 14, phone line interface 16 and ring detector 19, and can also direct higher level operations such as dialing phone numbers prior to transmitting or receiving data.

Figure 2:
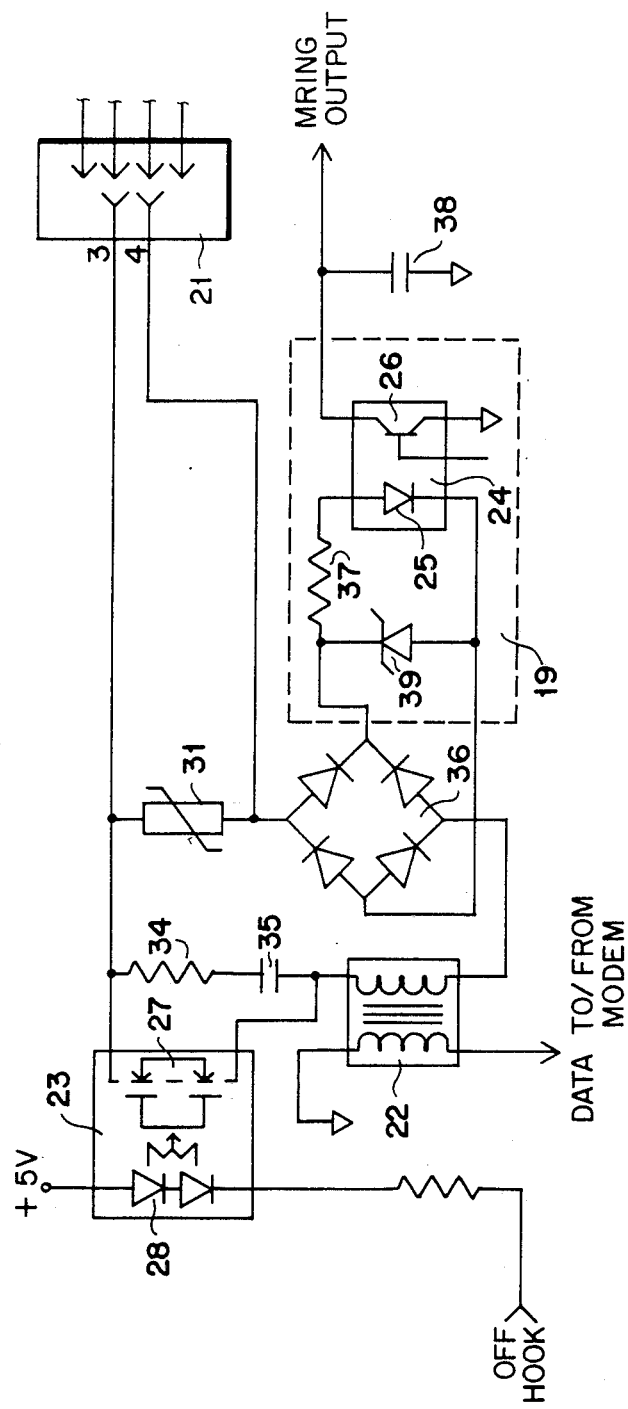
FIG. 2 is a schematic diagram of the phone line interface and ring detector circuits shown in FIG. 1.

The operation of the phone line interface 16 and the ring detector 14 can be more easily understood with reference to FIG. 2, which is a schematic diagram of these circuits. The connection to the telephone lines is provided by connector 21, an RJ11C jack. Only the Tip and Ring connection pins, pins 3 and 4, are used. Isolation between the telephone network and the modem is accomplished by audio transformer 22 for the data path connection and by opto-isolators 23 and 24 for the command signals. Varistor 31 provides fault protection for phone interface circuit 16 and ring detector circuit 14 to meet FCC and Canadian telecommunication interface standards.

Ring detection is accomplished by providing an AC path for the ring signal from the Tip line of connector 21 through the components of ring detector circuit 19 to the Ring line of connector 21. The ring signal is connected through resistor 34, capacitor 35 and transformer 22 to the input of full wave rectifier 36. Rectifier 36 provides a DC bias voltage across the inputs of opto-isolator 24 when an incoming call is present, causing the output of opto-isolator 24, the MRING signal, to change states. Opto-isolator 24 comprises light emitting diode 25 and photo-transistor 26. The DC signal from rectifier 36 is connected through resistor 37 across light emitting diode 25. The base of transistor 26 is left unconnected, with the emitter connected to ground and the collector connected to the MRING output line. The ring signal causes diode 25 to provide the current needed to turn on photo-transistor 26, pulling the MRING output signal to ground. Zener diode 39 and resistor 37 limit the amount of current which flows through diode 25. Capacitor 38 smooths out the ripple caused by the ring signal in the MRING output signal. The MRING output line is configured as an "open drain" connection, which ensures that there is no power drawn from the host computer when transistor 26 is turned off.

After an incoming call is detected and power to the modem has been turned on, the modem can answer the call by asserting the OFF HOOK signal, generated by the microprocessor controller causing opto-isolator 23 to close a hook switch connection across switch 27. This provides a DC data path for connecting the phone line to the modem through audio transformer 22. When an incoming call is to be answered, or when an outgoing call is to be made, the DC path is established in the phone line interface circuit by asserting the OFF HOOK signal. The OFF HOOK signal is applied to light emitting diodes 28 in opto-isolator 23, turning diodes 28 on and causing switch 27 to close. This creates a DC path around capacitor 35 and resistor 34, connecting the phone input or output signal across transformer 22, diode bridge 36 and opto-isolator 24.

Because opto-isolator 24 is included in both the AC and the DC paths, the MRING output can be used for two separate functions, to detect and indicate incoming calls, and to indicate that there is a DC connection to the phone line.

It is important to note that ring detector 19 draws no power while monitoring for incoming calls or to provide the incoming call indication signal. The power needed to activate the MRING notification signal to the host computer is taken from the telephone ring signal. It is only after the modem has been commanded to receive incoming data that the circuit draws the power required to operate diodes 28 to close switch 27 and make the data path connection.

Also, it should be noted that isolation is provided at each of the interfaces between the telephone network and the host computer or the modem. Opto-isolator 23 provides isolation for the OFF HOOK signal, opto-isolator 26 provides isolation for the MRING output signal, and audio transformer 22 provides isolation for the data signals transmitted or received.

The switchable power supply, which can be turned on or off by host computer 11 with the MODEMON signal, provides a regulated source of +5 V and −5 V for the modem. When power supply 15 is turned on, it draws power from the host computer's power source 20, a battery which is an unregulated source of +5.6 V to +7.5 V. The battery connection is called VBAT. Most important for the present invention, when power supply 15 is turned off, it draws substantially no power from the computer's battery and thus maximizes the life of the battery. For example, when power supply 15 is turned on, the modem typically draws about 35 milliamps of current from the computer's battery. When power supply 15 is turned off, the current drawn by the modem of the preferred embodiment is reduced to about 0.1 microamps. However, according to the invention, a reduction of current draw to less than 100 microamps can produce satisfactory results.

Figure 3:
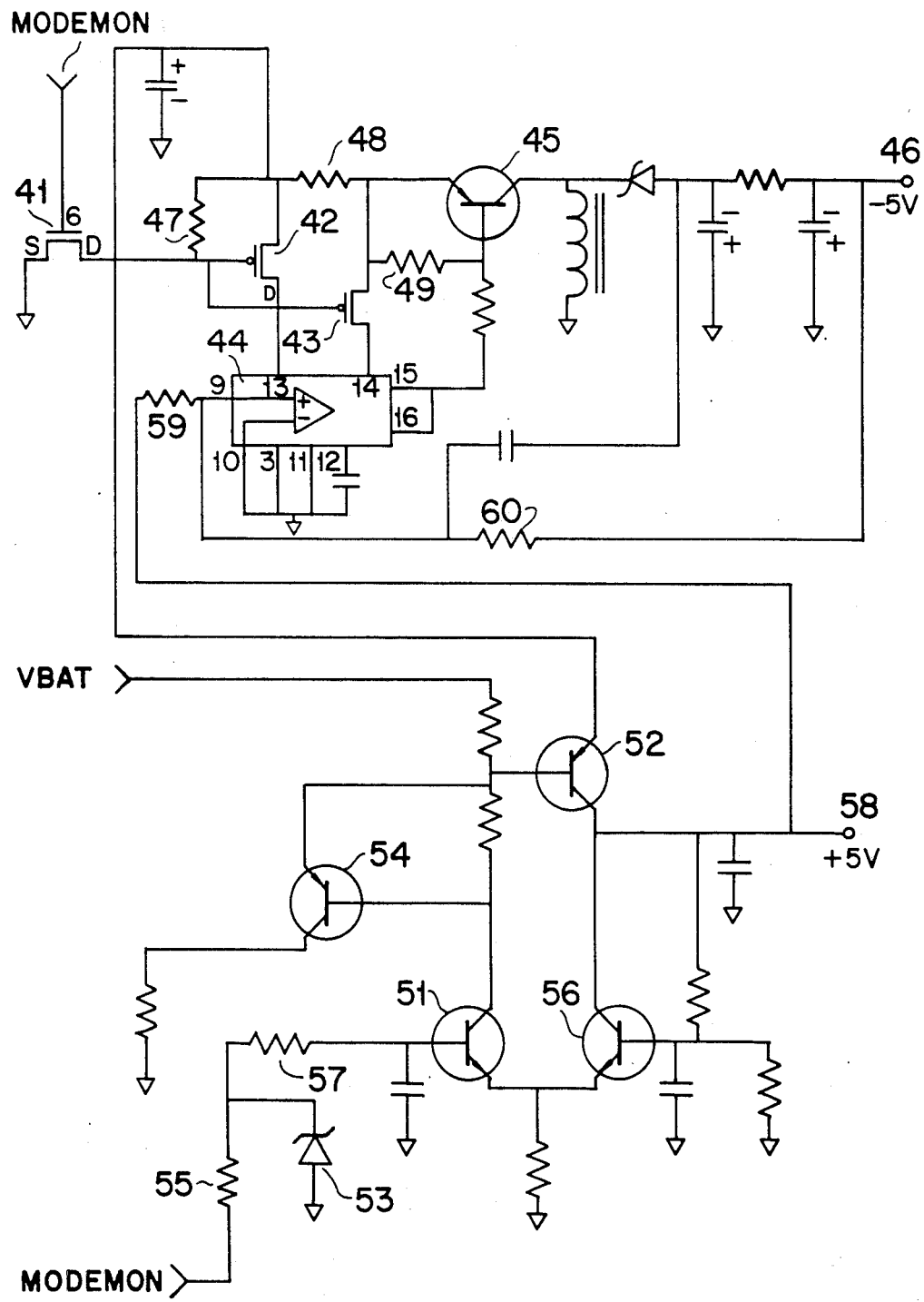
FIG. 3 is a schematic diagram of the switchable power supply shown in FIG. 1.

A schematic diagram of power supply 15 is shown in FIG. 3. Power supply 15 has two parts, a negative voltage supply circuit whose output is −5 V, shown in the upper portion of FIG. 3, and a positive voltage supply circuit whose output is +5 V, shown in the lower portion of FIG. 3. Both these circuits draw power from the VBAT input and are controlled by the MODEMON input signal.

The negative voltage supply circuit is switched on and off by field effect transistors 41, 42 and 43. The MODENON signal is applied to the gate of transistor 41. The source of transistor 41 is connected to ground and its drain is connected to the gates of transistors 42 and 43. When the MODEMON signal is low, transistor 41 is turned off, and the voltage at the gates of transistors 42 and 43 is pulled up to battery voltage through resistor 47 so that transistors 42 and 43 also are turned off. This in turn turns off transistor 45 by allowing its base and emitter to be pulled up to battery voltage through resistors 48 and 49. When the MODEMON signal goes high, transistor 41 is turned on, pulling the voltage at the gates of transistors 42 and 43 to ground so that transistors 42 and 43 are turned on. This connects battery voltage to regulator 44 activating the negative voltage supply circuit. As long as regulator 44 is activated, it provides a supply of −5 V at output 46 by controlling transistor 45 in a switching mode. A suitable switching power supply regulator is the Fairchild uA78S40.

The positive voltage supply is switched on and off using transistor 51, zener diode 53 and resistors 55 and 57. Diode 53 has a high accuracy breakdown voltage and, when the MODEMON signal goes high, diode 53 clamps the voltage at the base of transistor 51 above the 0.7 V required to turn transistor 51 on. When the MODEMON signal is low, no current flows through resistors 55 and 57 and transistor 51 is turned off. When the MODEMON signal goes high, current flows through resistors 55 and 57, and transistor 51 is turned on. This turns on transistor 52 to supply voltage from the VBAT input to the positive voltage output 58. Transistors 51, 54 and 56 are biased to cooperate with transistor 52 to regulate the voltage provided at output 58 at +5 V. The +5 V and the −5 V outputs are combined through resistors 59 and 60 to provide feedback to regulator 44, so that any change in the +5 V output is tracked by the −5 V output.

General Operation

The modem operates in two modes, "Command Mode" and "Data Mode". In Command Mode, the modem is ready to receive and execute commands from the host computer or to auto-answer an incoming phone call.

In Data Mode, the modem can only pass data from the host computer to the phone line and from the phone line to the host computer. The modem will not treat any of the data received in Data Mode as commands; it ignores the data as it passes the data on through.

The modem automatically moves into Data Mode when it has established a valid data connection with another modem. This occurs when the modem answers an incoming call and successfully handshakes with the calling modem or when it places a call and successfully handshakes with the answering modem.

The modem can also be placed into Data Mode by the execution of a command to go on-line as the originating modem or a command to go on-line as the answering modem, if the ensuing handshake is successful.

In Command Mode, the modem responds to a set of "intelligent modem" commands which include commands to answer an incoming call, to dial an outgoing call, to go off-hook or to go on-hook to make or terminate a phone line connection, and to specify the current operating status. In addition, other commands can set more basic operating parameters in the modem, e.g., the number of rings the modem waits before answering a call, and the waiting times and pause times used by the modem in dialing and answering calls.

The modem will enter Command Mode any time the carrier signal is lost. (Loss of carrier can be caused by severe noise on the line, the remote modem turning off carrier, or a break in the connection.) The modem will also return to Command Mode if an abort command is executed.

The modem can also be placed in Command Mode by asserting the RCM signal. This procedure is used to force the modem to leave the Data Mode without breaking an already established data connection. All other ways of returning to the command mode break the data connection.

The baud rate selection for the modem is handled by the modem itself. The only baud rates which the modem will recognize while in command mode are 1200 bps, 300 bps, 150 bps and 110 bps. However, once a data connection has been established for Bell 103J mode, it will receive and transmit 0 thru 300 BPS in a transparent manner.

Figure 4:
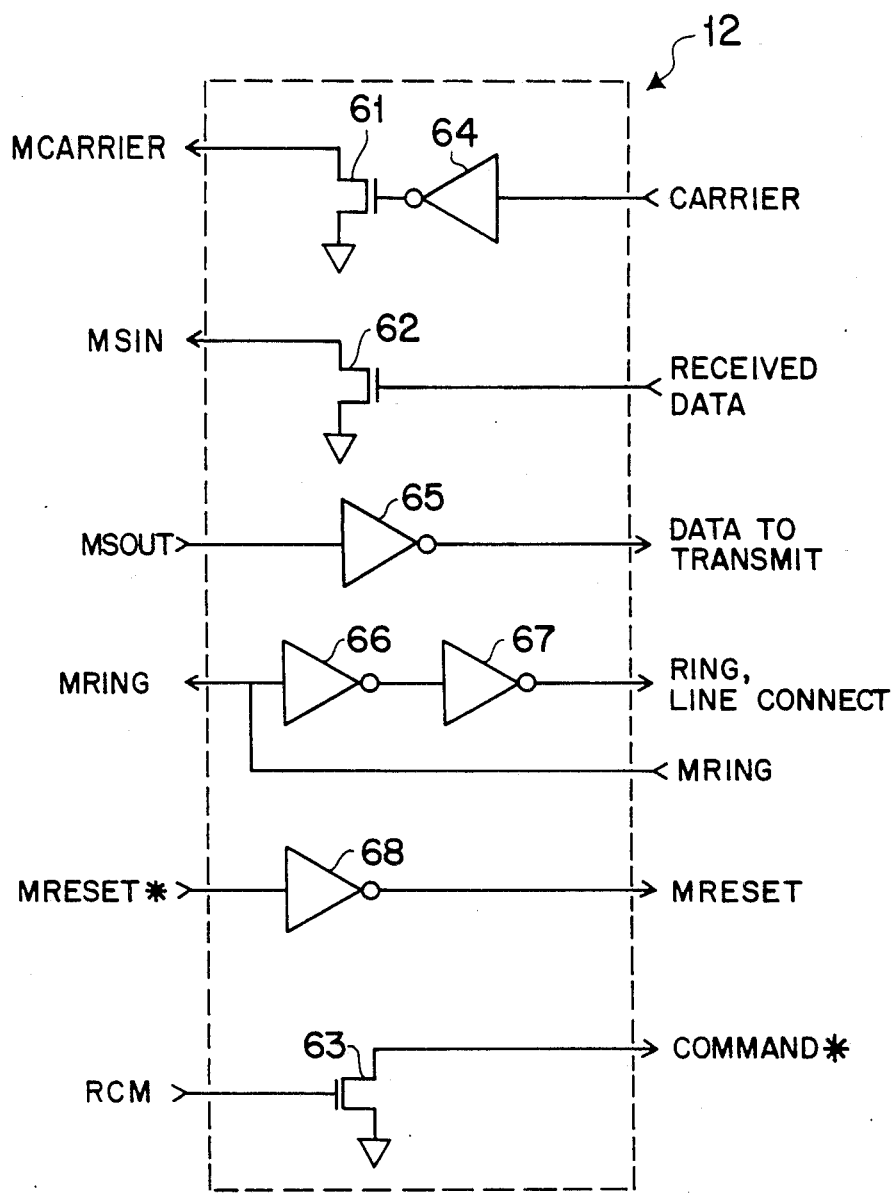
FIG. 4 is a schematic diagram of the isolator circuits shown in FIG. 1.

The interface between modem 10 and host computer 11 is provided by isolator circuits 12 as illustrated in FIG. 4. In FIG. 4, the connections to host computer 11 are on the left and the connections to modem circuits are on the right. Isolation is provided by making the connections between the modem and the computer through field effect transistors 61, 62 and 63, and through inverters 64, 65, 66, 67 and 68. One type of inverter suitable for the circuit is a Motorola MC14049 CMOS inverting buffer.

The Modem Carrier signal (MCARRIER), an active high signal from the modem to the host computer, is buffered by transistor 61. Inverter 64 preserves the logic level of the signal. The MCARRIER signal indicates when an active carrier is being detected by the modem. The Modem Serial In signal (MSIN), the data from the modem to the host computer, is buffered by transistor 62. The Modem Serial Out signal (MSOUT), the data from the host computer to the modem, is buffered through inverter 65. The Modem Ring signal (MRING*), an active low signal from the modem to the host computer, is a buffered output from opto-isolator 24, so it can be fed directly to the host computer. However, MRING is also used as an input to other modem circuits, and this input must be isolated from the host computer. This is accomplished by inverters 66 and 67. The Modem Reset signal (MRESET*), is a command signal from the host computer to the modem which forces a reset of the modem when low and allows the modem to function normally when high. The Return to Command Mode signal (RCM), a command signal from the host computer to the modem, is buffered by transistor 63.

In operation, the modem of the invention makes it feasible for a battery operated computer to monitor incoming telephone calls for relatively long periods of time. This is possible because the modem can operate with virtually zero power consumption while it monitors the telephone lines to detect incoming calls.

The modem is normally in the zero power mode, with the MODEMON signal from the host computer low, so the modem's power supply 15 is turned off. When switched off, power supply 15 draws no measurable power from the host computer's battery power supply. The transistor switches in power supply 15 isolate the modem's components from the computer's battery.

As described above, inverters 64–68 and field effect transistors 61–63 of isolator circuit 12 prevent leakage through the other connections between the modem and the computer. Also, opto-isolator 23 in phone line interface circuit 16 and opto-isolator 24 in ring detector circuit 19 prevent leakage through the connections to the phone lines.

Thus, with the modem in its zero power mode, the host computer is isolated from any potential power drains associated with data input or output through the modem. The computer needs only to provide power for its own internal requirements. If the computer has a "sleep" mode, in which the internal power requirements are minimized, the power drain for the system can be lowered even further and battery life increased accordingly.

When an incoming call occurs, ring detector 19 uses the AC ring signal from the call to cause opto-isolator 24 to change the state of the MRING output. This signal is sent to host computer 11, to notify the computer of the incoming call so the computer can take the appropriate action. For example, the MRING signal could bring the computer out of the sleep mode and trigger the loading of a program for processing incoming data. If the incoming call is to be answered, host computer 11 switches the MODEMON signal to high, turning on the modem's switchable power supply 15 and thus activating the other components in the modem necessary to receive and to transmit data and to execute commands from host computer 11.

I claim:

1. A modem for modulating digital data from a computer for transmission over telephone lines, demodulating data received over the telephone lines for input to the computer, and monitoring the telephone lines to detect an incoming call, using substantially no power from the host computer while monitoring the telephone lines to detect an incoming call, said modem comprising:
    modulating and demodulating circuits;
    a switchable power supply capable of being remotely switched on and off by a signal from the computer, said switchable power supply, when switched on, drawing power from the computer's power source for the modem and, when switched off, drawing substantially no power from the computer's power source;
    isolator circuits for coupling the modem to the computer to permit exchange of command and data signals between the computer and the modem, and for preventing power leakage from the computer to the modem when the switchable power supply is switched off;
    a telephone interface circuit for coupling the modulating and demodulating circuits to the telephone lines to permit exchange of data signals between the telephone lines and the modulating and demodulating circuits, said interface circuit including means for isolating the modulating and demodulating circuits from the telephone lines; and
    a ring detector circuit connected to the telephone interface circuit and responsive to the ring signal of an incoming telephone call to produce an output signal for indicating the presence of the incoming call to the computer, said ring detector circuit being operable for detecting incoming calls, but drawing substantially no power from the computer's power source, while the switchable power supply is switched off.

2. The modem of claim 1 wherein:
    said telephone interface circuit includes an AC path across the telephone lines, said AC path including a diode bridge rectifier;
    said ring detector circuit includes an opto-isolator comprising a light emitting diode and a photo transistor, said light emitting diode connected across the output of the diode bridge rectifier and optically coupled to the photo transistor, the emitter of the photo transistor connected to a reference potential and the collector of the photo transistor connected to an output line; and
    said diode bridge rectifier produces a DC voltage across the light emitting diode on occurrence of an AC ring signal, causing the photo transistor to conduct and dropping the voltage on the output line to the reference potential.

3. The modem of claim 1 wherein said telephone interface circuit includes:
    an opto-isolator responsive to a command signal to provide a DC path across the telephone lines; and
    an audio transformer in the DC path for coupling data signals received over the telephone lines to the modulating and demodulating circuits.

4. The modem of claim 1 wherein said isolator circuits comprise a plurality of buffers, and each of the command and data signals exchanged between the computer and the modem passes through at least one of the buffers.

* * * * *